US008239751B1

(12) United States Patent
Rochelle et al.

(10) Patent No.: US 8,239,751 B1
(45) Date of Patent: Aug. 7, 2012

(54) DATA FROM WEB DOCUMENTS IN A SPREADSHEET

(75) Inventors: Jonathan Rochelle, Chester, NJ (US); Micah G. Lemonik, New York, NY (US); David J. Vespe, New York, NY (US)

(73) Assignee: Google Inc., Mountain View, CA (US)

( * ) Notice: Subject to any disclaimer, the term of this patent is extended or adjusted under 35 U.S.C. 154(b) by 1054 days.

(21) Appl. No.: 11/749,679

(22) Filed: May 16, 2007

(51) Int. Cl.
*G06F 17/00* (2006.01)
*G06F 17/20* (2006.01)
*G06F 17/21* (2006.01)
*G06F 17/22* (2006.01)
*G06F 17/24* (2006.01)
*G06F 17/25* (2006.01)
*G06F 17/26* (2006.01)
*G06F 17/27* (2006.01)
*G06F 17/28* (2006.01)
*G06F 15/16* (2006.01)

(52) U.S. Cl. ........ 715/220; 715/212; 715/219; 709/203; 709/219; 707/E17.032

(58) Field of Classification Search ........... 715/220, 715/212, 219; 709/203, 219; 707/10, 1, 707/100, E17.032, E11.204
See application file for complete search history.

(56) References Cited

U.S. PATENT DOCUMENTS

| 4,888,690 | A | 12/1989 | Huber | 364/200 |
|---|---|---|---|---|
| 4,899,292 | A | 2/1990 | Montagna et al. | 364/521 |
| 5,475,819 | A | 12/1995 | Miller et al. | |
| 5,544,051 | A | 8/1996 | Senn et al. | 364/419.19 |
| 5,560,005 | A * | 9/1996 | Hoover et al. | 707/E17.032 |
| 5,574,898 | A | 11/1996 | Leblang et al. | |
| 5,778,378 | A | 7/1998 | Rubin | 707/103 |
| 5,815,415 | A | 9/1998 | Bentley et al. | 364/578 |
| 5,832,479 | A | 11/1998 | Berkowitz et al. | 707/3 |
| 5,870,739 | A | 2/1999 | Davis, III et al. | 707/4 |
| 5,905,980 | A | 5/1999 | Masuichi et al. | 707/1 |
| 5,946,692 | A | 8/1999 | Faloutsos et al. | 707/101 |
| 5,963,940 | A | 10/1999 | Liddy et al. | 707/5 |
| 6,006,221 | A | 12/1999 | Liddy et al. | 707/5 |
| 6,014,661 | A | 1/2000 | Ahlberg et al. | 707/3 |
| 6,026,388 | A | 2/2000 | Liddy et al. | 707/1 |
| 6,029,195 | A | 2/2000 | Herz | 709/219 |

(Continued)

FOREIGN PATENT DOCUMENTS

WO WO 2004/114163 A2 12/2004

OTHER PUBLICATIONS

Bharat, *Personalized, Interactive News on the Web*, Georgia Institute of Technology, Atlanta, GA, May 5, 1997, pp. 1-22.

(Continued)

*Primary Examiner* — Stephen Hong
*Assistant Examiner* — Nicholas Hasty
(74) *Attorney, Agent, or Firm* — Morgan, Lewis & Bockius LLP

(57) ABSTRACT

A spreadsheet user interface accepts a request for at least one fact, the request comprising a user-selected identifier for the desired fact. Responsive to the entry of the request, a fact repository containing information derived from unstructured documents is accessed. The fact or facts corresponding to the request, if any, are retrieved from the repository, and the results are displayed at the location of the spreadsheet that is associated with the request.

27 Claims, 13 Drawing Sheets

U.S. PATENT DOCUMENTS

| | | | |
|---|---|---|---|
| 6,101,515 A | 8/2000 | Wical et al. | 707/531 |
| 6,105,020 A | 8/2000 | Lindsay et al. | 707/2 |
| 6,105,030 A * | 8/2000 | Syed et al. | 707/E17.007 |
| 6,216,138 B1 | 4/2001 | Wells et al. | 707/502 |
| 6,222,540 B1 | 4/2001 | Sacerdoti | 345/339 |
| 6,263,328 B1 | 7/2001 | Coden et al. | 707/3 |
| 6,263,335 B1 | 7/2001 | Paik et al. | 707/5 |
| 6,304,864 B1 | 10/2001 | Liddy et al. | 706/15 |
| 6,311,189 B1 | 10/2001 | deVries et al. | 707/102 |
| 6,326,962 B1 | 12/2001 | Szabo | 345/348 |
| 6,327,574 B1 | 12/2001 | Kramer et al. | 705/14 |
| 6,377,943 B1 | 4/2002 | Jakobsson | 707/2 |
| 6,480,194 B1 | 11/2002 | Sang'udi et al. | 345/440 |
| 6,519,631 B1 | 2/2003 | Rosenschein et al. | 709/217 |
| 6,529,900 B1 | 3/2003 | Patterson et al. | 707/3 |
| 6,584,464 B1 | 6/2003 | Warthen | 707/4 |
| 6,606,659 B1 | 8/2003 | Hegli et al. | 709/225 |
| 6,609,123 B1 * | 8/2003 | Cazemier et al. | 1/1 |
| 6,629,097 B1 | 9/2003 | Keith | 707/5 |
| 6,643,641 B1 | 11/2003 | Snyder | 707/4 |
| 6,718,324 B2 | 4/2004 | Edlund et al. | 707/5 |
| 6,832,218 B1 | 12/2004 | Emens et al. | 707/3 |
| 6,850,896 B1 | 2/2005 | Kelman et al. | 705/10 |
| 6,873,982 B1 | 3/2005 | Bates et al. | 707/5 |
| 6,885,990 B1 | 4/2005 | Ohmori et al. | 704/270 |
| 6,928,436 B2 | 8/2005 | Baudel | 707/6 |
| 6,961,723 B2 | 11/2005 | Faybishenko et al. | 707/3 |
| 6,968,343 B2 | 11/2005 | Charisius et al. | 707/102 |
| 7,013,308 B1 * | 3/2006 | Tunstall-Pedoe | 707/709 |
| 7,031,955 B1 | 4/2006 | de Souza et al. | 707/3 |
| 7,043,521 B2 | 5/2006 | Eitel | 709/202 |
| 7,100,083 B2 * | 8/2006 | Little et al. | 714/26 |
| 7,146,538 B2 | 12/2006 | Johnson et al. | 714/30 |
| 7,158,983 B2 | 1/2007 | Willse et al. | 707/101 |
| 7,233,951 B1 * | 6/2007 | Gainer et al. | 707/E17.108 |
| 7,669,115 B2 * | 2/2010 | Cho et al. | 715/212 |
| 2002/0055954 A1 * | 5/2002 | Breuer | 707/507 |
| 2002/0065814 A1 | 5/2002 | Okamoto et al. | 707/3 |
| 2002/0065815 A1 | 5/2002 | Layden | 707/3 |
| 2002/0128818 A1 * | 9/2002 | Ho et al. | 704/9 |
| 2002/0154175 A1 | 10/2002 | Abello et al. | 345/853 |
| 2002/0173984 A1 | 11/2002 | Robertson et al. | 705/1 |
| 2003/0005036 A1 | 1/2003 | Mitzenmacher | 709/203 |
| 2003/0069880 A1 | 4/2003 | Harrison et al. | 707/3 |
| 2003/0097357 A1 | 5/2003 | Ferrari et al. | 707/3 |
| 2003/0115485 A1 | 6/2003 | Milliken | 713/201 |
| 2003/0120373 A1 | 6/2003 | Eames | 700/128 |
| 2003/0120644 A1 | 6/2003 | Shirota | 707/3 |
| 2003/0120654 A1 | 6/2003 | Edlund et al. | 707/7 |
| 2003/0120659 A1 | 6/2003 | Sridhar | 707/100 |
| 2003/0154071 A1 | 8/2003 | Shreve | 704/9 |
| 2003/0158855 A1 | 8/2003 | Farnham et al. | 707/102 |
| 2003/0195872 A1 | 10/2003 | Senn | 707/3 |
| 2003/0208665 A1 | 11/2003 | Peir et al. | 711/169 |
| 2003/0217052 A1 | 11/2003 | Rubenczyk et al. | 707/3 |
| 2004/0030731 A1 | 2/2004 | Iftode et al. | 707/205 |
| 2004/0107125 A1 | 6/2004 | Guheen et al. | 705/7 |
| 2004/0122844 A1 | 6/2004 | Malloy et al. | 707/102 |
| 2004/0125137 A1 | 7/2004 | Stata et al. | 345/764 |
| 2004/0167909 A1 * | 8/2004 | Wakefield et al. | 707/100 |
| 2004/0220904 A1 | 11/2004 | Finlay et al. | 707/3 |
| 2004/0236655 A1 | 11/2004 | Scumniotales et al. | 705/36 |
| 2004/0255237 A1 | 12/2004 | Tong | 715/501.1 |
| 2004/0267700 A1 * | 12/2004 | Dumais et al. | 707/2 |
| 2005/0022009 A1 | 1/2005 | Aguilera et al. | 713/201 |
| 2005/0033803 A1 | 2/2005 | Vleet et al. | 709/203 |
| 2005/0039033 A1 | 2/2005 | Meyers et al. | 713/193 |
| 2005/0050016 A1 | 3/2005 | Stanoi et al. | 707/3 |
| 2005/0055327 A1 | 3/2005 | Agrawal et al. | 707/1 |
| 2005/0057566 A1 | 3/2005 | Githens et al. | 345/440 |
| 2005/0060277 A1 | 3/2005 | Zlatanov et al. | 707/1 |
| 2005/0076012 A1 | 4/2005 | Manber et al. | 707/3 |
| 2005/0086520 A1 | 4/2005 | Dharmapurikar et al. | 713/201 |
| 2005/0120004 A1 | 6/2005 | Stata et al. | 707/3 |
| 2005/0187898 A1 | 8/2005 | Chazelle et al. | 707/1 |
| 2005/0216464 A1 | 9/2005 | Toyama et al. | 707/9 |
| 2005/0219929 A1 | 10/2005 | Navas | 365/212 |
| 2005/0256825 A1 | 11/2005 | Dettinger et al. | 707/1 |
| 2005/0268212 A1 | 12/2005 | Dagel | 715/500 |
| 2006/0004851 A1 | 1/2006 | Gold et al. | 707/103 X |
| 2006/0020582 A1 | 1/2006 | Dettinger et al. | 707/3 |
| 2006/0047838 A1 | 3/2006 | Chauhan | 709/230 |
| 2006/0085386 A1 * | 4/2006 | Thanu et al. | 707/2 |
| 2006/0085465 A1 | 4/2006 | Nori et al. | 707/101 |
| 2006/0149700 A1 | 7/2006 | Gladish et al. | 707/1 |
| 2006/0173824 A1 | 8/2006 | Bensky et al. | 707/3 |
| 2006/0206508 A1 | 9/2006 | Colace et al. | 707/100 |
| 2006/0224582 A1 * | 10/2006 | Hogue | 707/6 |
| 2007/0022085 A1 | 1/2007 | Kulkarni | 707/1 |
| 2007/0055656 A1 | 3/2007 | Tunstall-Pedoe | 707/3 |
| 2007/0067108 A1 | 3/2007 | Buhler et al. | 702/19 |
| 2007/0179965 A1 | 8/2007 | Hogue et al. | 707/102 |
| 2007/0203867 A1 | 8/2007 | Hogue et al. | 706/48 |
| 2007/0203868 A1 | 8/2007 | Betz | 706/50 |
| 2007/0271249 A1 | 11/2007 | Cragun et al. | 707/3 |
| 2008/0005064 A1 | 1/2008 | Sarukkai | 707/3 |
| 2008/0097958 A1 | 4/2008 | Ntoulas et al. | 707/2 |
| 2008/0209444 A1 * | 8/2008 | Garrett et al. | 719/320 |

OTHER PUBLICATIONS

*Bloom filter*, Wikipedia, en.wikipedia.org/wiki/Bloom_filter (last modified Feb. 13, 2005), pp. 1-4.

Bloom, *Space/Time Trade-offs in Hash Coding with Allowable Errors*, Communications of the ACM, vol. 13, No. 7, Jul. 1970, pp. 422-426.

Brill, *An Analysis of the AskMSR Question-Answering System*, Proceedings of the Conference of Empirical Methods in Natural Language Processing (EMNLP), Jul. 2002, 8 pages.

Brin, *Extracting Patterns and Relations from the World Wide Web*, Computer Science Department, Stanford University, 1999, 12 pages.

Brin, *The Anatomy of a Large-Scale Hypertextual Web Search Engine*, 7th International World Wide Web Conference, Brisbane, Australia, Apr. 14-18, 1998, pp. 1-26.

Cao, *Bloom Filters—the math*, www.cs.wisc.edu/~cao/papers/summary-cache/node8.html, Jul. 5, 1998, pp. 1-6.

Chang, *IEPAD: Information Extraction Based on Pattern Discovery*, WWW10 '01, ACM, Hong Kong, May 1-5, 2001, pp. 681-688.

Chesnais, *The Fishwrap Personalized News System*, Community Networking, Integrated Multimedia Services to the Home, Proceedings of the Second International Workshop on, Jun. 20-22, 1995, pp. 275-282.

Chu-Carroll, *A Multi-Strategy with Multi-Source Approach to Question Answering*, IBM T.J. Watson Research Center, Yorktown Heights, NY, 2006, 8 pages.

Clarke, *FrontPage 2002 Tutorials—Adding Functionality to your Website with FrontPage 2002 Part II—Navigation*, ABC—All 'Bout Computers, Apr. 2002, vol. 11, accessfp.net/fronpagenavigation.htm, 8 pages.

Cowie, *MOQA: Meaning-Oriented Question Answering*, Proceedings of RIAO 2004, 15 pages.

Dean, *MapReduce: Simplified Data Processing on Large Clusters*, OSDI, 2004, pp. 1-13.

Etzioni, *Web-scale Information Extraction in KnowItAll (Preliminary Results)*, WWW2004, ACM, New York, NY, May 17-20, 2004, 11 pages.

Freitag, *Boosted Wrapper Induction*, American Association for Artificial Intelligence, 2000, 7 pages.

Guha, *Disambiguating People in Search*, WWW2004, New York, NY, May 17-22, 2004, 9 pages.

Guha, *Object Co-Identification on the Semantic Web*, WWW2004, ACM, New York, NY, May 17-22, 2004, 9 pages.

Hogue, *Tree Pattern Inference and Matching for Wrapper Induction on the World Wide Web*, Master of Engineering in Electrical Engineering and Computer Science, Massachusetts Institute of Technology, Jun. 2004, pp. 1-106.

Ilyas, *Rank-Aware Query Optimization*, ACM SIGMOD 2004, Paris, France, Jun. 13-18, 2004, 12 pages.

*Information Entropy*—Wikipedia, the free encyclopedia, retrieved on May 3, 2006, pp. 1-9.

*Information Theory*—Wikipedia, the free encyclopedia, retrieved on May 3, 2006, pp. 1-12.

International Search Report/Written Opinion, PCT/US06/07639, Sep. 13, 2006, 5 pages.
International Search Report/Written Opinion, PCT/US07/061157, Feb. 15, 2008, 10 pages.
International Search Report/Written Opinion, PCT/US07/61156, Feb. 11, 2008, 5 pages.
International Search Report/Written Opinion, PCT/US2006/010965, Jul. 5, 2006, 9 pages.
International Search Report/Written Opinion, PCT/US2007/061158, Feb. 28, 2008, 7 pages.
Jones, *Bootstrapping for Text Learning Tasks*, Carnegie Mellon University, Pittsburgh, PA, 1999, 12 pages.
Kamba, *The Krakatoa Chronicle, An interactive, Personalized, Newspaper on the Web*, w3.ord/conferences/www4/papers/93, 1993, pp. 1-12.
Kosseim, *Answer Formulation for Question-Answering*, Concordia University, Montreal, Quebec, Canada, Oct. 1, 2007, 11 pages.
Lin, *Question Answering from the Web Using Knowledge Annotation and Knowledge Mining Techniques*, CIKM'03, New Orleans, LA, Nov. 3-8, 2003, pp. 116-123.
Liu, *Mining Data Records in Web Pages*, Conference '00, ACM 2000, pp. 1-10.
McCallum, *Object Consolidation by Graph Partitioning with a Conditionally-Trained Distance Metric*, SIGKDD 03, Washington, DC, Aug. 24-27, 2003, 6 pages.
Mihalcea, *PageRank on Semantic Networks, with Application to Word Sense Disambiguation*, Proceedings of the 20th International Conference on Computational Linguistics, Aug. 23-27, 2004, 7 pages.
Mihalcea, *TextRank: Bringing Order into Texts*, Proceedings of the Conference on Empirical Methods in Natural Language Processing, Jul. 2004, 8 pages.
Nyberg, *The JAVELIN Question Answering System at TREC2003: A Multi Strategy Approach With Dynamic Planning*, TREC2003, Nov. 18-21, 2003, 9 pages.
Ogden, *Improving Cross-Language Text Retrieval with Human Interactions*, Proc. of the 33rd Hawaii International Conference on System Sciences, IEEE 2000, pp. 1-9.
Prager, *IBM's Piquant in TREC2003*, Nov. 18-21, 2003, 10 pages.
Prager, *Question Answering Using Constraint Satisfaction: QA-by Dossier with Constraints*, 2004, 8 pages.
Ramakrishnan, *Is Question Answering an Acquired Skill?*, WWW2004, New York, NY, May 17, 2004, pp. 111-120.
*The Math Works, Using Matlab Graphics*, Version 5, MathWorks, Natick, MA, Dec. 1996.
Thompson, *Freshman Publishing Experiment Offers Made-to-Order Newspapers*, MIT News Office, http://web.mit.edu/newsoffice/1994/newspaper-0309.html, 1994, pp. 1-4.

\* cited by examiner

Example Format of Facts in Repository (each fact is associated with an object ID)

Example Facts in Repository (each fact is associated with an object ID)

Example Object
Reference Table**

Example Format of Facts in Repository (each fact is associated with an object ID)

Example Objects

| File | Edit | Sort | Formula | 402

| | A | B | C | D |
|---|---|---|---|---|
| | Baseball Hall of Fame Players | | | |
| 2 | Name | Rookie Year | Hits | Games |
| 3 | Hank Aaron | 1954 | 3771 (life) | 3298 (life) |
| 4 | Pete Alexander | <No data> | <No data> | <No data> |
| 5 | | | | |
| 6 | | | | |
| 7 | | | | |
| 8 | | | | |
| 9 | | 1.3 billion | | |

DATA FROM WEB DOCUMENTS IN A SPREADSHEET

1. Field of Art

The present invention generally relates to the field of computer systems and software, and more specifically, to spreadsheets.

2. Description of the Related Art

People have long used spreadsheets for storing and analyzing information. Spreadsheets can organize large amounts of information and can perform operations such as sorting and addition on the information. Use of a spreadsheet for large amounts of information, however, has several drawbacks. Entering a large amount of information into a spreadsheet first involves obtaining the information through research or other laborious tasks. Then, after the information is obtained, it must be manually input or imported into the spreadsheet. Manual data entry is extremely time-consuming, and it is also error-prone. Even though importing multiple data items is faster than manual entry, and—assuming the data source is reputable—also more reliable, it is still limited and inflexible because of the need to specify a specific data source and choose among a limited number of specific categories of data within that data source.

Some conventional spreadsheets allow importing information from a database.

However, such conventional importation has several drawbacks. As a threshold matter, it is time-consuming even to locate a publicly-available database with the necessary information. Further, even if this hurdle is overcome, there still exists the drawback that conventional databases tend to contain information about certain predefined topics, and that, moreover, information in a database tends to be stored in predefined fields. Under most circumstances, a user must know the name of a database in order to make use of its information and must know how that information is organized within the database.

From the above, there is a need for a system and process to make the process of entering information in a spreadsheet easier for a user.

SUMMARY

Embodiments of the present invention comprise methods for adding information to a spreadsheet. In one embodiment, a user request to add a fact is received by a spreadsheet, the request containing a user-selected identifier for the requested fact, the user-selected identifier is associated with a location of the spreadsheet, the requested fact is received from a repository of information derived from unstructured documents, and the received fact is inserted into the location in the spreadsheet associated with the user-selected identifier. Additional embodiments are directed to systems and to computer-readable memories having features relating to the foregoing aspects.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

The disclosed embodiments have other advantages and features which will be more readily apparent from the following detailed description and the appended claims, when taken in conjunction with the accompanying drawings, in which:

FIG. 2(*e*) is a block diagram illustrating an alternate data structure for facts and objects in accordance with one embodiment.

FIG. 4 illustrates a data view of the spreadsheet data according to one embodiment.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles described herein.

Architectural Overview

Figure 1:
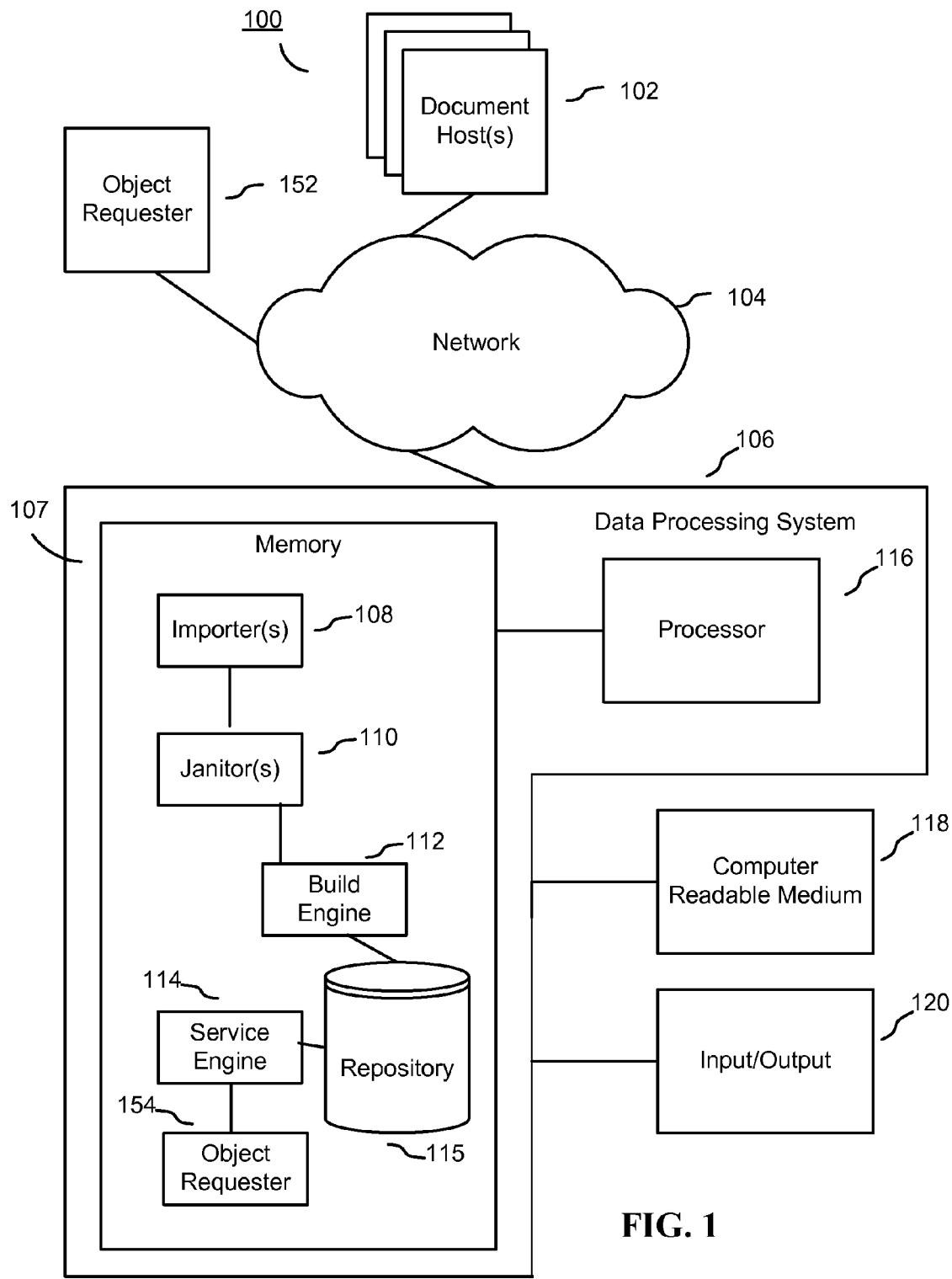
FIG. 1 illustrates a system architecture adapted to support one embodiment.

FIG. 1 shows a system architecture 100 adapted to support one embodiment. FIG. 1 shows components used to add facts into, and retrieve facts from a repository 115. The system architecture 100 includes a network 104, through which any number of document hosts 102 communicate with a data processing system 106, along with any number of object requesters 152, 154.

Document hosts 102 store documents and provide access to documents. A document is comprised of any machine-readable data including any combination of text, graphics, multimedia content, etc. A document may be encoded in a markup language, such as Hypertext Markup Language (HTML), i.e., a web page, in a interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, JAVA®). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. Data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. The importers 108 also determine the subject or subjects with which the facts are associated, and extract such facts into individual items of data, for storage in the repository 115. In one embodiment, there are different types of importers 108 for different types of documents, for example, dependent on the format or document type.

Janitors 110 operate to process facts extracted by the importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from the repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears' birthday is "Dec. 2, 1981" while on another page that her date of birth is "Dec. 2, 1981." Birthday and Date of Birth might both be rewritten as Birthdate by one janitor and then another janitor might notice that Dec. 2, 1981 and Dec. 2, 1981 are different forms of the same date. It would choose the preferred form, remove the other fact and combine the source lists for the two facts. As a result, one source page for this fact will contain an exact match of the fact while another source page will contain text that is considered synonymous with the fact.

The build engine 112 builds and manages the repository 115. The service engine 114 is an interface for querying the repository 115. The service engine 114's main function is to process queries, score matching objects, and return them to the caller but it is also used by the janitor 110.

The repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

The repository 115 contains one or more facts. In one embodiment, each fact is associated with exactly one object. One implementation for this association includes in each fact an object ID that uniquely identifies the object of the association. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in the repository 115 are described below, in relation to FIGS. 2(a)-2(d).

It should be appreciated that in practice at least some of the components of the data processing system 106 will be distributed over multiple computers, communicating over a network. For example, the repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on the data processing system 106 instead of being coupled to the data processing system 106 by a network. For example, importer the 108 may import facts from a database that is a part of or associated with the data processing system 106.

FIG. 1 also includes components to access the repository 115 on behalf of one or more object requesters 152, 154. Object requesters are entities that request objects from the repository 115. Object requesters 152, 154 may be understood as clients of the system 106, and can be implemented in any computer device or architecture. As shown in FIG. 1, a first object requester 152 is located remotely from system 106, while a second object requester 154 is located in the data processing system 106. For example, in a computer system hosting a blog, the blog may include a reference to an object whose facts are in the repository 115. An object requester 152, such as a browser displaying the blog, will access data processing system 106 so that the information of the facts associated with the object can be displayed as part of the blog web page. As a second example, janitor 110 or other entity considered to be part of data processing system 106 can function as an object requester 154, requesting the facts of objects from the repository 115.

FIG. 1 shows that the data processing system 106 includes a memory 107 and one or more processors 116. The memory 107 includes the importers 108, janitors 110, build engine 112, service engine 114, and requester 154, each of which is preferably implemented as instructions stored in memory 107 and executable by processor 116. Memory 107 also includes the repository 115. The repository 115 can be stored in a memory of one or more computer systems or in a type of memory such as a disk. FIG. 1 also includes a computer readable medium 118 containing, for example, at least one of importers 108, janitors 110, the build engine 112, the service engine 114, the requester 154, and at least some portions of the repository 115. FIG. 1 also includes one or more input/output devices 120 that allow data to be input and output to and from the data processing system 106. It will be understood that embodiments of the data processing system 106 also include standard software components such as operating systems and the like and further include standard hardware components not shown in the figure for clarity of example.

Figure 2A:
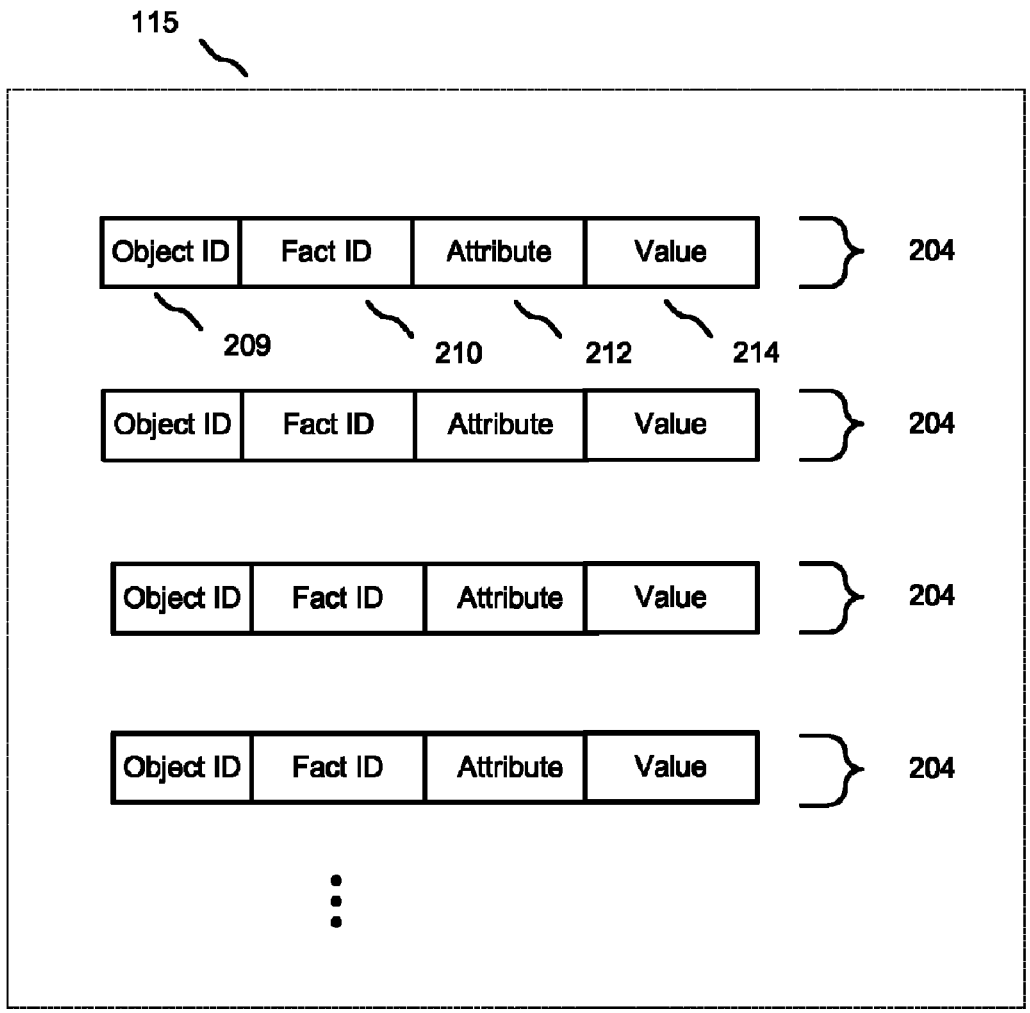
FIGS. 2(*a*)-2(*d*) are block diagrams illustrating a data structure for facts within a repository of FIG. 1 in accordance with various embodiments.
Figure 2B:
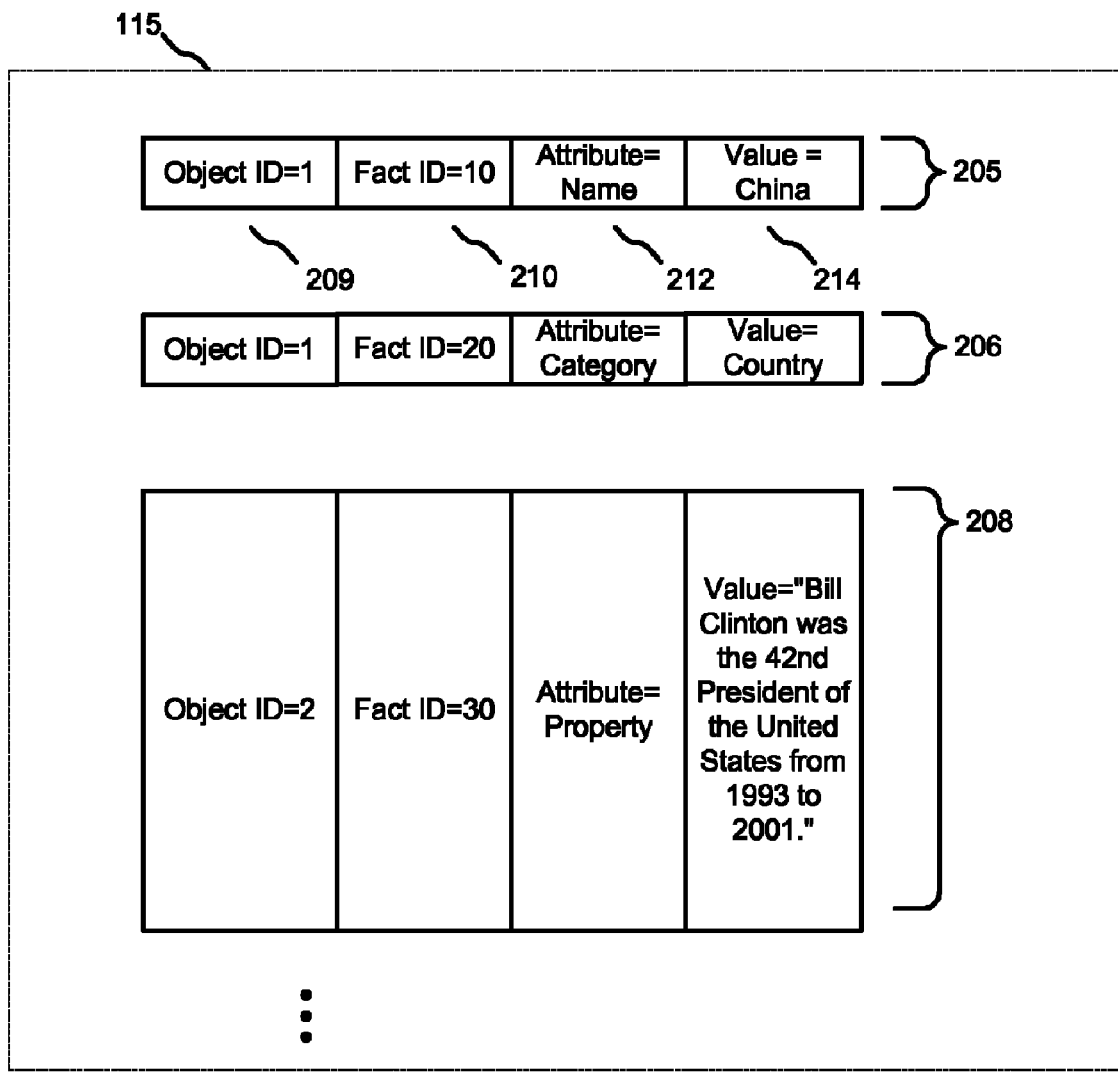
Figure 2C:
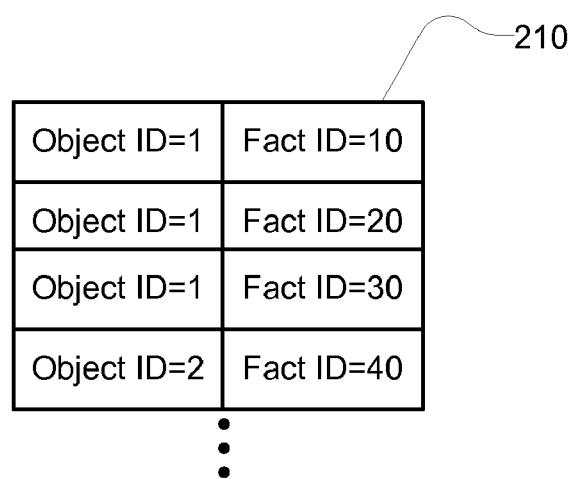
Figure 2D:
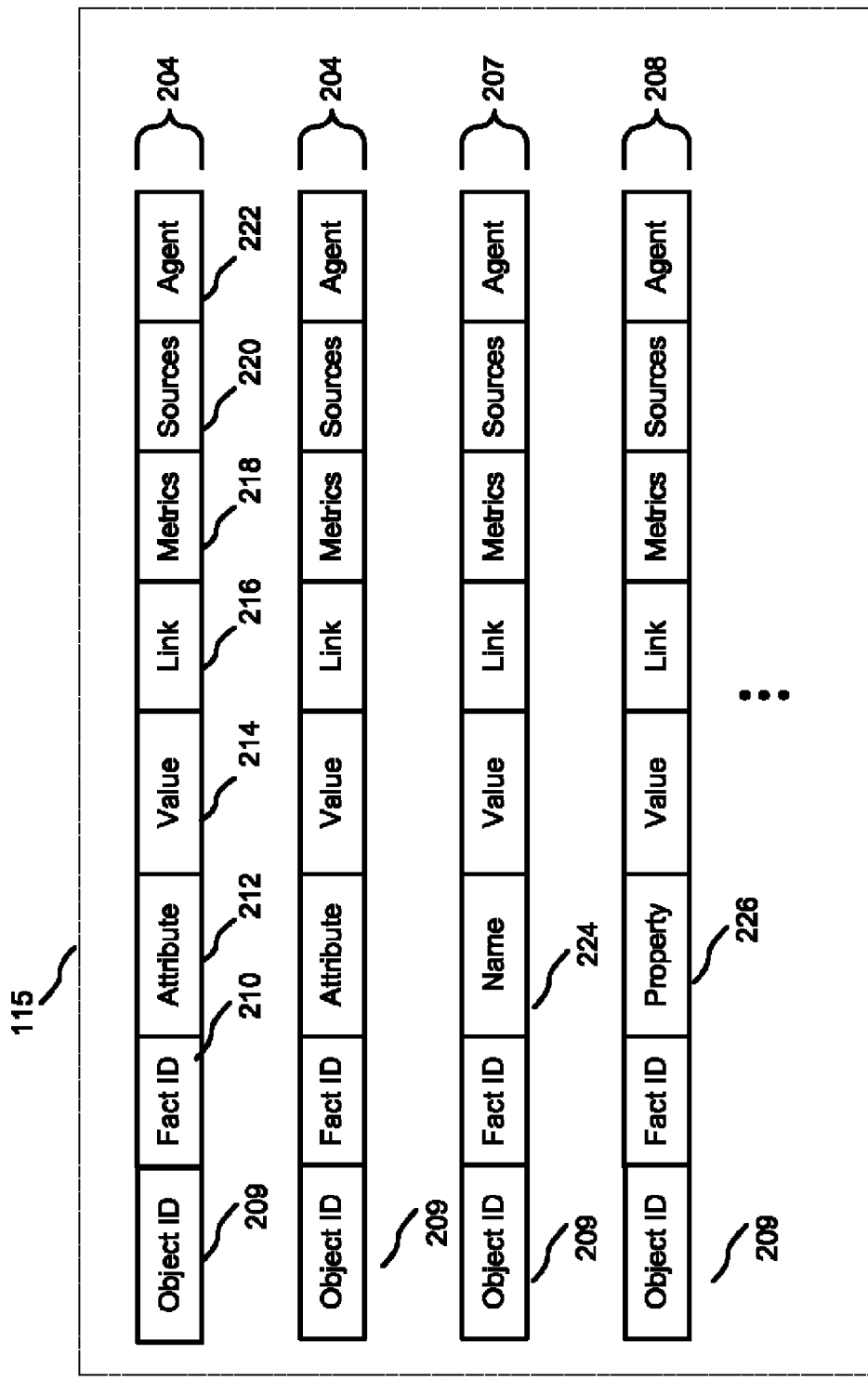

FIG. 2(a) shows an example format of a data structure for facts within the repository 115, according to some embodiments. As described above, the repository 115 includes facts 204. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "Feb. 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

FIG. 2(*b*) shows an example of facts having respective fact IDs of 10, 20, and 30 in the repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, and perhaps even tables of figures. This content can be formatted, for example, in a markup language. For example, a fact having an attribute "original html" might have a value of the original html text taken from the source web page.

Also, while the illustration of FIG. 2(*b*) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

FIG. 2(*c*) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository 115 to find all facts with a particular object ID. While FIGS. 2(*b*) and 2(*c*) illustrate the object reference table 210 with explicit coding of object and fact IDs, the table also may contain just the ID values themselves in column or pair-wise arrangements.

FIG. 2(*d*) shows an example of a data structure for facts within the repository 115, according to some embodiments, showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in the repository 115. In some embodiments, the value field 214 stores the name of the linked object and the link 216 stores the object identifier of the linked object. Thus, this "president" fact would include the value 214 of "George W. Bush," and an object reference link 216 that contains the object ID for the "George W. Bush" object. In some other embodiments, facts 204 do not include a link field 216 because the value 214 of a fact 204 may store a link to another object.

Each fact 204 also may include one or more metrics 218. A metric provides an indication of the quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(*d*) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same fields (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Bill Clinton, the value of a property fact may be the text string "Bill Clinton was the 42nd President of the United States from 1993 to 2001." Some object IDs may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s) and/or properties may be represented by special records that have a different format than the general fact records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance set to a negative value). However, the facts of the null object are treated as if they were removed from the repository 115. In some other embodiments, facts of null objects are physically removed from the repository 115.

Figure 2E:
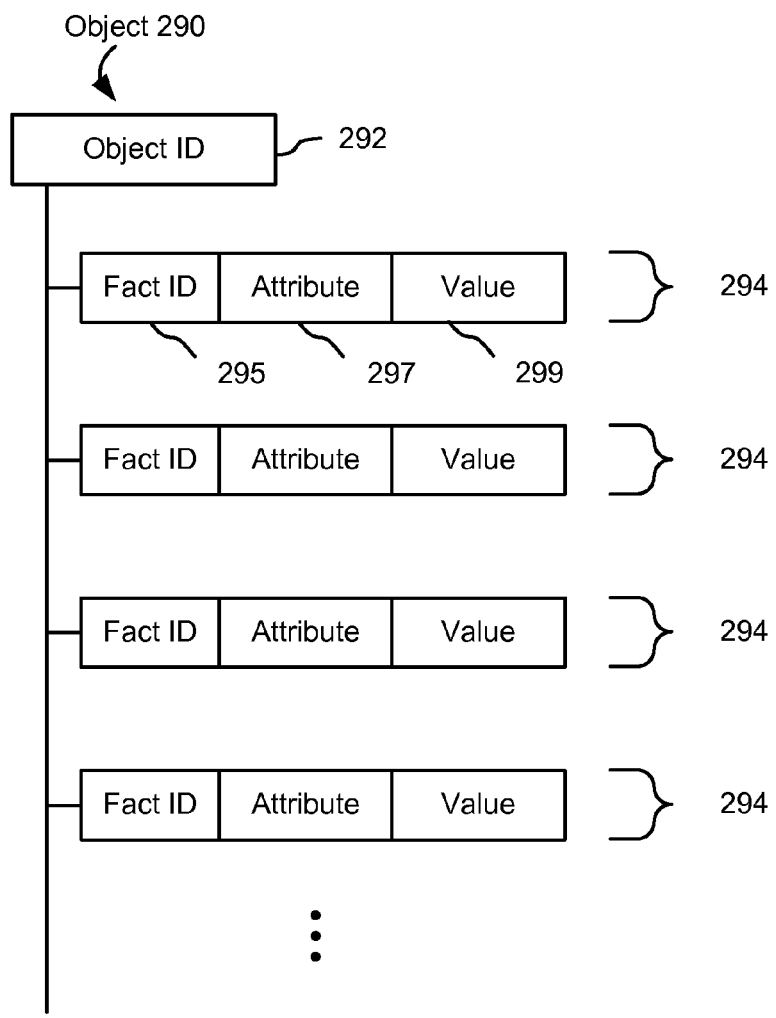

FIG. 2(e) is a block diagram illustrating an alternate data structure for facts and objects in accordance with one embodiment. In this data structure, an object 290 contains an object ID 292 and references or points to facts 294. Each fact includes a fact ID 295, an attribute 297, and a value 299. In this embodiment, an object 290 actually exists in memory 107.

Figure 3:
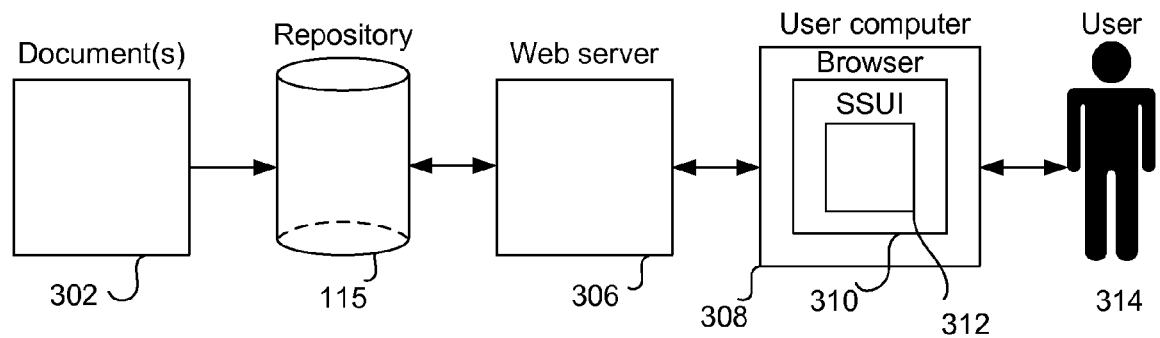
FIG. 3 provides a high-level view of a system architecture having a web-based spreadsheet according to one embodiment.

FIG. 3 provides a high-level view of the system architecture having a web-based spreadsheet according to one embodiment. As described above, the contents of documents 302 hosted by document hosts 102 are described as objects having facts with attributes and values. The objects are held within the repository 115. A user 314 interacts with his or her computer 308, entering a request for a fact into the spreadsheet user interface 312 (SSUI), which, in the embodiment, runs within a web browser 310. The browser 310 then sends a query based on the user request to a web server 306, which then extracts the requested fact from the repository 115. The query may be in a format understood by the repository 115 or may be converted into such a format before being presented to the repository, for example, by web server 306. The web server 306 provides the fact back to the web browser 310, which then displays it within the SSUI 312. In one embodiment, the web server 306 and/or user computer 308 essentially act as object requestors 152, 154 within the context of FIG. 1.

As mentioned above, in one embodiment, the SSUI 312 is executed within a web browser 310. For example, the SSUI 312 can be provided by the web server 306 and rendered by the web browser 310. To this end, the SSUI 312 can be described by HTML and/or Asynchronous JavaScript and XML (AJAX) code interpreted by the web browser 310, and/or by other types of code. Likewise, the SSUI 312 can also be provided by an application executing on the user computer 308 independent of the web browser. For example, the SSUI 312 can be provided by a traditional spreadsheet application such as MICROSOFT EXCEL that employs a user interface based on an API provided by the operating system and that communicates with the repository using any appropriate mechanism for passing requests and receiving facts. Other variations and combinations of these techniques can also be utilized to provide the SSUI 312.

User Interface

Figure 5:
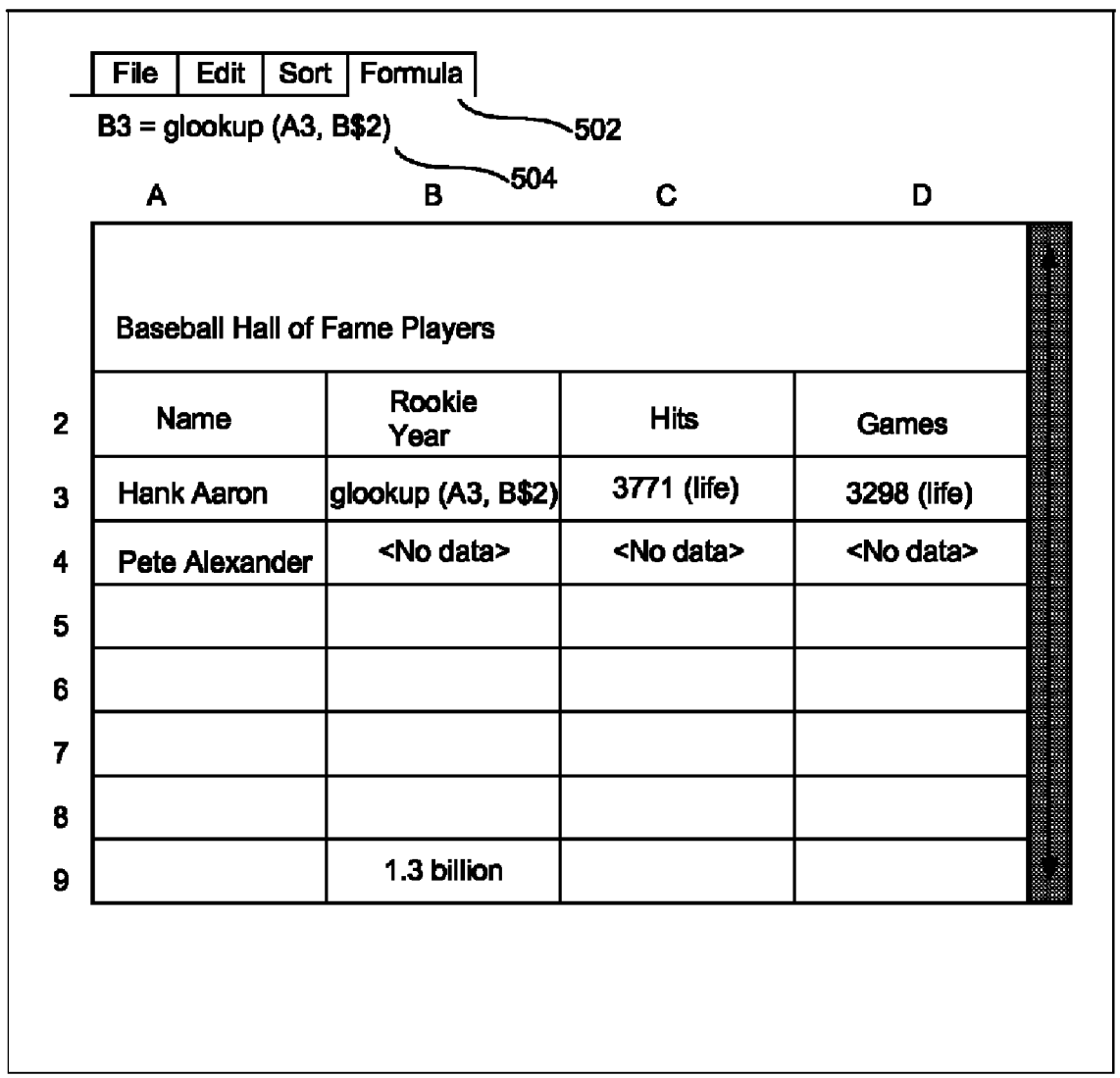
FIGS. 5-7 illustrate formula views of the spreadsheet data according to one embodiment.
Figure 6:
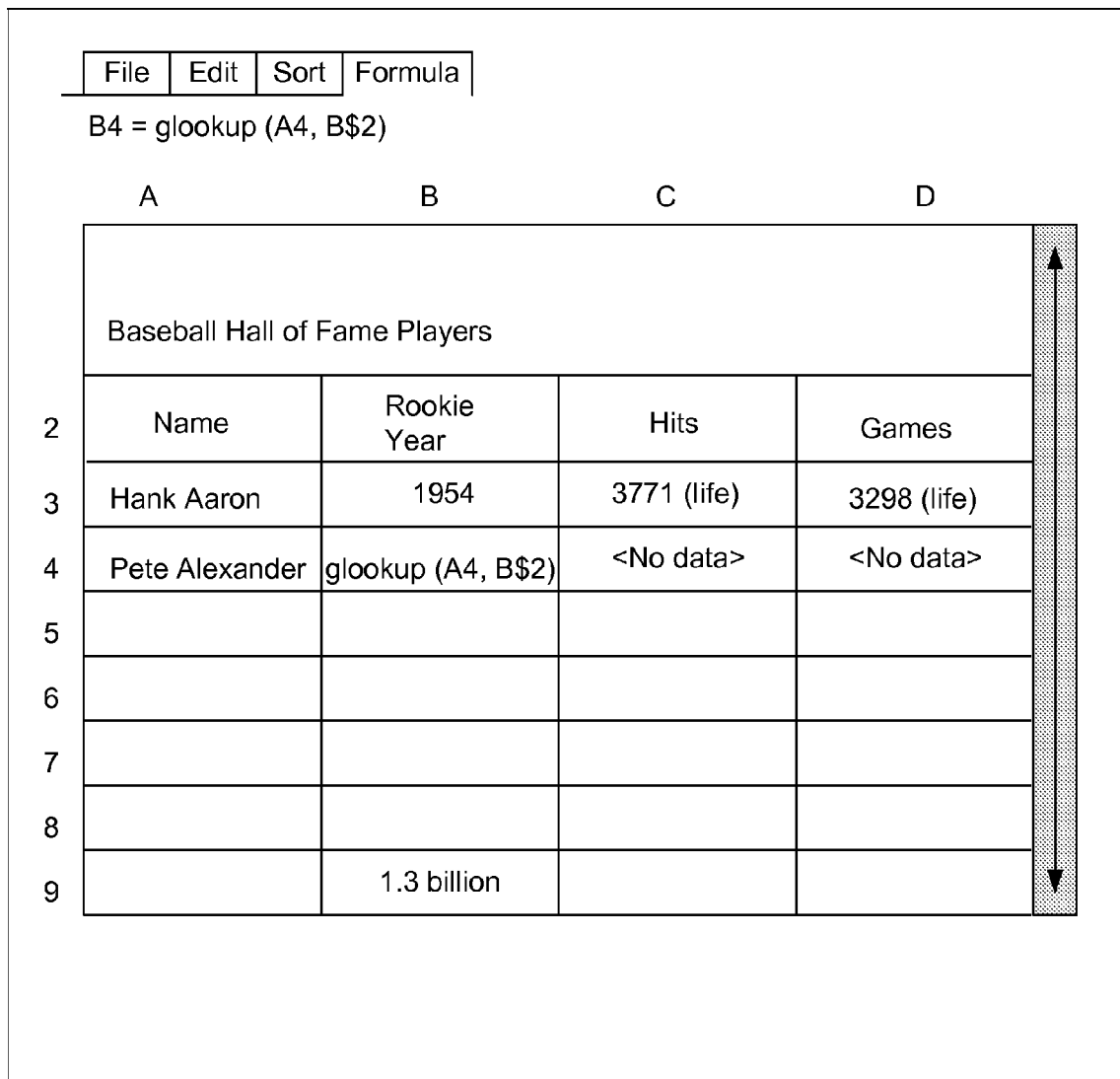
Figure 7:

FIGS. 4-7 illustrate data views according to embodiments of the SSUI 312. Specifically, FIG. 4 illustrates a data view of the spreadsheet data according to one embodiment, and FIGS. 5-7 illustrate formula views of the spreadsheet data according to various embodiments.

The interface of FIG. 4 contains a tab-based menu system 402, allowing the user to perform different operations on the spreadsheet data, such as copying cells, sorting, or entering formulas that describe the desired facts. In FIG. 4, the "File" tab is selected to show a data view, showing data in cells but not the formulas on which the data are based, if any. In addition, the interface of FIG. 4 includes a cell area 404 that includes a set of rows and a set of columns, with a row-column pair constituting a cell. In one embodiment, each cell is capable of containing a value, such as a literal string value or a value derived from a formula associated with the cell. The formula can reference a fact stored in the repository 115. In such a case, the SSUI 312 retrieves the value of the appropriate fact from the repository 115 and inserts the fact into the cell, thereby allowing the facts in the repository 115 to be used in the spreadsheet.

In the spreadsheet of FIG. 4, row 1 is a single cell containing the heading "Baseball Hall of Frame Players" as a literal string value. Row 2 contains four cells (cells A2-D2) each containing a literal string value describing an attribute of a fact associated with the baseball players, including "Name," "Rookie Year," "Hits," and "Games." Column A, the "Name" column, includes the names of baseball players "Hank Aaron" and "Pete Alexander" in cells A3 and A4, respectively. Row 3, associated with Hank Aaron, contains values for cells in the "Rookie Year," "Hits," and "Games" columns. Row 4, associated with Pete Alexander, shows "<No data>" in each of these cells. The "<No data>" value indicates that the repository 115 contains no data for the associated fact, or that the data have not yet been retrieved from the repository. Additionally, cell B9 contains specific data, unrelated to the column headings in row 2.

FIG. 5 illustrates a formula view for the spreadsheet of FIG. 4, where the formula view was obtained by selecting the Formula tab 502 from the menu. A formula entry area 504 below the menu displays an editable, user-selected formula that describes the fact value that the user desires to appear in a selected cell. In one embodiment, the formula describes a query to the repository 115 and data to display in a cell in response to the query. While a specific formula syntax is described herein, those of skill in the art will recognize that many other query syntaxes, such as free-form natural language strings, are equally possible. The disclosed formula syntax is merely an example of a user-selected identifier that the user uses to reference facts in the repository 115.

In one embodiment, a formula specifying a value for a cell is in the form "glookup(<object>, <attribute>)." Here, the "glookup( )" function notation indicates to the spreadsheet that the cell data is not literal, but rather must be derived in some manner. Furthermore, the particular function name, "glookup," indicates that the particular way in which the cell data must be derived is via a query of the repository 115.

The first argument to the glookup function is the name of the object about which information is desired, and the second argument represents the particular attribute of that object about which information is sought. For example, a formula 'glookup("China", "population")' references the "population" attribute of the "China" object. The arguments may be literals, as in the formula 'glookup("China", "population")', or they may be references to values of cells. In the case of cell references, the value of the argument is the data value of the given cell, such as A3 or B$2. A dollar sign in a cell reference indicates that the cell reference should not be changed when the formula containing it is applied to other cells, as is explained in more detail below.

In the example of FIG. 5, the user has entered the formula "=glookup (A3, B$2)" into the formula entry area 504 corresponding to cell B3. This formula states that cell B3 should contain the results of a repository lookup on an object from cell A3 ("Hank Aaron") and the attribute from cell B2 ("Rookie Year"). Thus, this formula results in cell B3 having the value of Hank Aaron's rookie year (1954).

FIG. 6, like FIG. 5, illustrates a formula view for the spreadsheet of FIG. 4. Again, the view was obtained by selecting the Formula view via tab 502, and formula entry area 504 displays the editable formula describing the desired data for a particular cell (or group of cells). This time, however, it is cell B4, and not cell B3, that is selected, as shown by the display of the formula, rather than its corresponding result value, in cell B4. Note that the formula for this cell is "glookup(A4, B$2)." This change in the value of the first argument indicates that the object of the data access has changed from the contents of cell A3 to cell A4—Hank Aaron to Pete Alexander— and the lack of change in the value of the second argument indicates that the attribute of that object remains that of cell B2—that is, the string "Rookie Year."

Such changes in cell formulas could be performed manually by the user, such as by retyping the formula for each cell, or copying and editing the text of the formula. Or, more conveniently, the formula entered in one cell can be applied to a range of cells determined by the user. For example, if the user had entered names of baseball players in cells A3 to A8 and wished to see when each of these players had his rookie year in the corresponding cells of B3 to B8, he or she could enter the formula "glookup(A3, B$2)" in cell B3, indicating a desire to see data corresponding to the combination of the object in cell A3 the attribute in cell B2. The user could then apply this formula to cells B4 through B8, such as by performing a "Copy" operation on cell B3, selecting cell range B4 through B8, and performing a "Paste" operation. The spreadsheet would then duplicate the formula to the new cell range, making modifications as appropriate, such as automatically changing cell reference A3 to A4, A5, A6, A7, and A8 to match the row in question. The dollar sign in the cell reference prevents the cell reference from being modified. Thus, if the formula "glookup(A3, B$2)" were pasted from cell B3 to cells B4 to B8, the spreadsheet would produce formulas in which the objects were the respective contents of cells A4 to A8, but the attribute was always the "Rookie Year" value of cell B2.

Finally, the user interface of FIG. 7 is similar to that of FIGS. 5 and 6, but illustrates a data access based on literal objects and attributes, as opposed to using cell references as in FIGS. 5 and 6. In this case, the desired data in cell B9 is found by applying the attribute "population" to the object "China"—in other words, looking up the population of China. Thus, in the exemplary embodiment a formula can be based on the value of other cells or on literal values (such as "China" or "population").

Logical Flow

Figure 8:
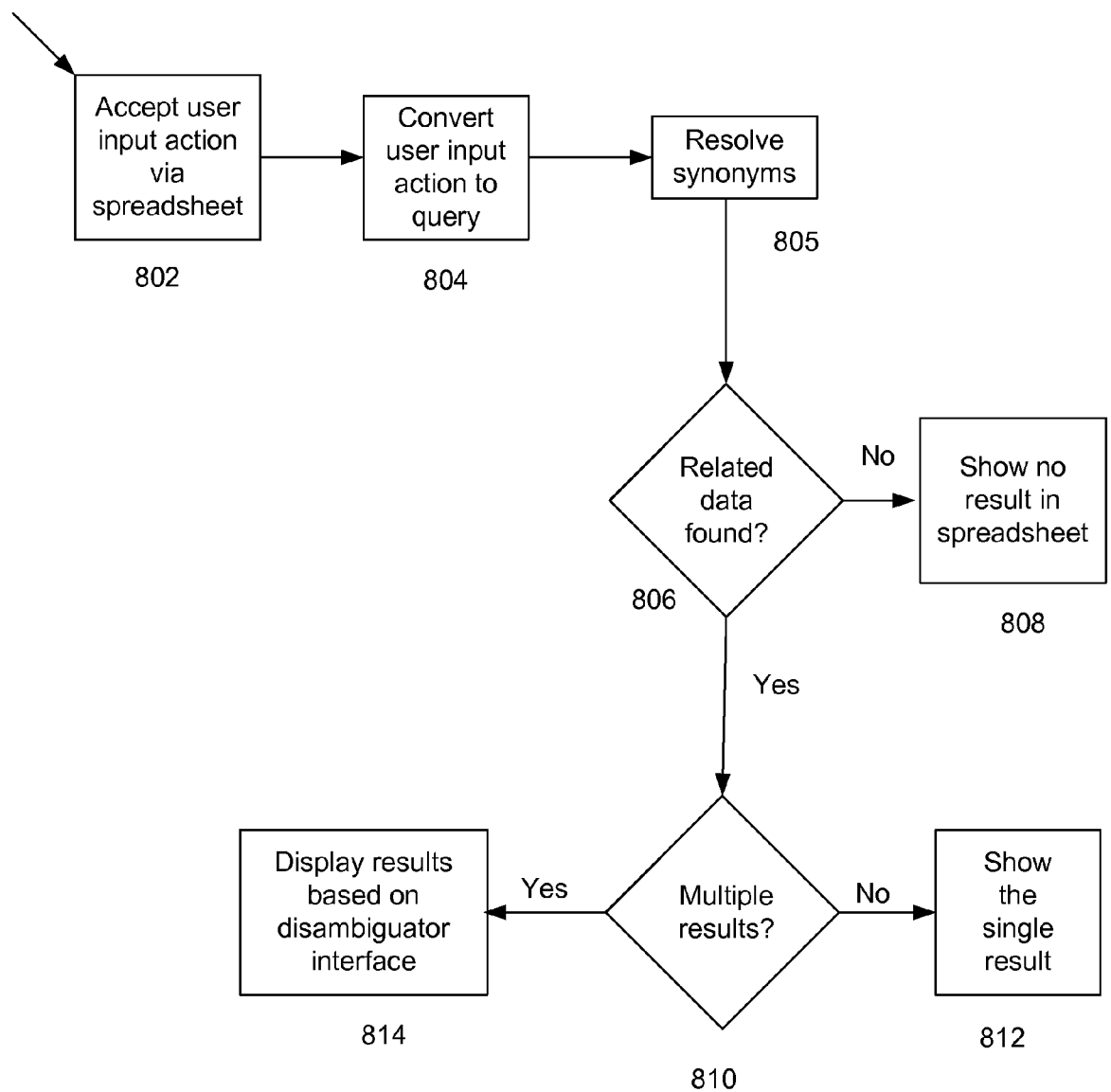
FIG. 8 is a flowchart of a method to request, look up, and display a fact, according to one embodiment.

FIG. 8 is a flowchart illustrating a method involved in requesting, looking up, and displaying a fact in the SSUI 312 according to one embodiment. The process begins when the SSUI 312 accepts 802 a user input action of a type signaling the SSUI 312 that external information is being requested. Such an action could be entering a particular glookup( ) formula, resulting in a single request, or applying an existing formula to a range of cells, resulting in multiple requests. It might also comprise specifying additional request parameters, such as the type and/or format of the data for the desired fact, which could be specified by selecting a cell or range of cells, choosing "Cell Format" from the Edit menu in the tab-based menu system 402, and specifying type and/or format from a resulting options window. The SSUI 312 then converts 804 this user action to a query or set of queries in a format understood by the repository 115. For example, the user-provided formula glookup("bill clinton", "date of birth") could be converted to a form such as name: "bill clinton" attribute{(date of birth)}, if the latter is the query format accepted by the repository. In some embodiments, this conversion occurs on the server instead of on the client side. A user input action affecting multiple cells, such as applying a formula to a range of cells, is broken up into a set of independent queries. Alternatively, the multiple objects and/ or attributes may all be specified within a single lengthy query.

If there are synonyms present in the formula, such as "birthday" or "dob" for "date of birth," then the SSUI 312 can resolve 805 these synonyms, such as by substituting the term used by the repository 115, e.g. substituting "date of birth" for the user-entered "birthday." A check for synonyms can be performed on the client side via software executable by the browser 310 and/or other software providing the spreadsheet, on the server side via software executable by the web server 306, or both. In one embodiment, software located on the server side translates between requests from the SSUI 312 and queries to the repository 115. This software may do preprocessing on the query (e.g., determining synonyms) or post-processing on the output of the repository (see step 810).

Then the SSUI 312 queries the repository 115 via the web server 306 using the various <object, attribute> pairs in one or more cells of the spreadsheet. The repository 115 then returns data to the SSUI 312. If the repository 115 did not find data related to the query 806 (e.g., it returned a null value) then the SSUI 312 shows 808 some indication in the appropriate cells that no related data was found, such as the "<No data>" strings of FIGS. 4 to 7.

If the repository 115 did find related data at step 806, then the question 810 is whether there were multiple results or only a single result. (Multiple results could be obtained, for example, if a single element of the request referred to multiple independent facts, such as a request for the date of birth of "George Bush", which could equally refer to either of two well-known persons, or a request for "songs" of "The Beatles." Multiple results could also occur due to errors in the repository data.) If there is only a single result, then the spreadsheet 312 displays 812 only that single result in the cell associated with the formula; if there are multiple results, then an embodiment of the SSUI 312 displays 814 a disambiguation interface, such as a dialog box with a selection list, that allows the user to select which result to display, and then displays the selected result within SSUI 312. In another embodiment, a post-processor on either the server or the client side automatically performs disambiguation, such as by selecting the result that has most frequently occurred in the past.

Figure 9:
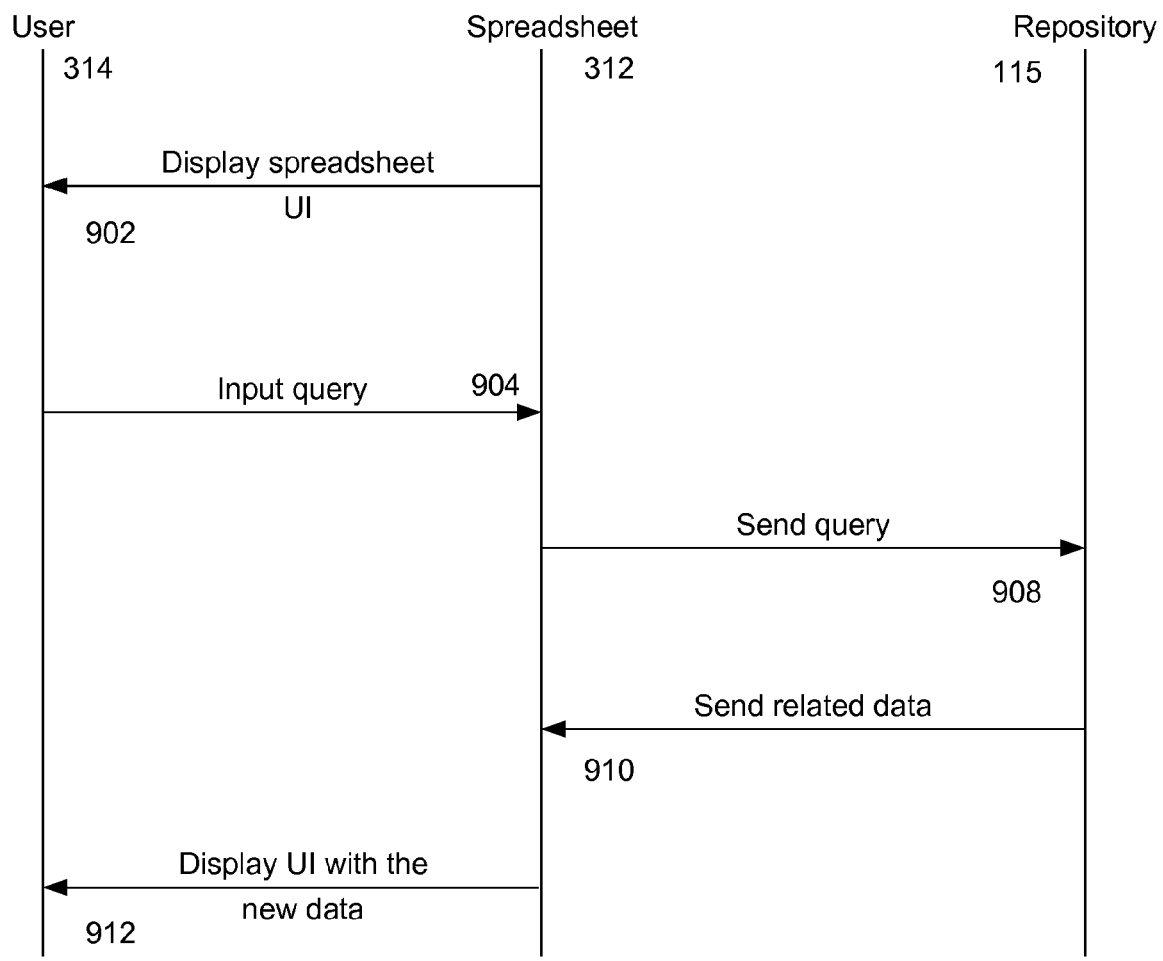
FIG. 9 is an interaction diagram illustrating the interactions that occur between the user, the spreadsheet, and the data repository when the user requests a fact in one embodiment.

FIG. 9 is an interaction diagram illustrating the interactions that occur between the user 314, the spreadsheet 312, and the data repository 115 when the user requests a fact in one embodiment. First, the spreadsheet displays 902 its user interface by which the user can make a request for data. Next, the user makes such a request, inputting 904 a query to be sent to the repository. This step includes converting 804 the user input action to a query and resolving 805 any synonyms, as discussed above in conjunction with FIG. 8. Next, each query is sent 908 to the repository, which responds by sending 910 the data relating to the query back to the spreadsheet. As noted, such data could include an indication that no related data was found, a single fact result, or multiple fact results. Additional data corresponding to the facts may also be provided, such as attribution data stating the source of the fact, or confidence data stating an estimated probability of the correctness of the fact. Finally, the spreadsheet displays 912 the retrieved facts within the spreadsheet user interface so that the user can view them. The way in which the facts are displayed can depend on factors such as whether the user requested a particular type and/or format for the desired fact data. The additional data corresponding to the facts may also be displayed.

One of skill in the art would appreciate that the present invention is not limited to this embodiment, but might equally be implemented in different ways. For example, a user input action such as applying a formula to a range of cells, rather than resulting in multiple separate queries, could equally be combined into a single multi-part query for the repository. As another example, caching of results on an intermediate server could be employed to avoid burdening the repository with duplicate queries from different users. As a further example, the values displayed in the SSUI 312 for the entered formulas can be updated from the repository on a periodic basis, such as hourly, to reflect any changes made to the repository since the formulas were first evaluated. As still another example, another embodiment could form implicit queries, so that typing "population" near to "China," for example, where nearness is evaluated according to a given rule, would initiate retrieving information about the population of China and presenting it to the user. Thus, many variations and optimizations are possible within the scope of the present invention.

It will be understood that data displayed to the user within the spreadsheet as alphanumeric characters such as "1," "2," "3" and so on may also be stored by the spreadsheet in a format that allows arithmetic operations to be performed on the data. Thus, it is possible to request a column of "induction dates," which are displayed as years using alphanumeric characters, but which are also stored in a numeric format. In such a case, these dates can be averaged and displayed within the spreadsheet using known arithmetic operations.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the invention. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for requesting the addition of a fact to a spreadsheet via a user-selected fact identifier through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A computer-implemented method for adding information to a spreadsheet, comprising:

on a client system having one or more processors and memory storing one or more programs to be executed by the one or more processors:

displaying a spreadsheet;

receiving a request to add a cell value to the spreadsheet, the request containing a reference to an object and an attribute;

generating a query corresponding to the request;

sending the query to a fact repository;

receiving the requested cell value from the fact repository, wherein the cell value correspond to a value of a fact, the fact being associated with an object in the fact repository, wherein a respective fact includes an attribute field indicating an attribute and a value field describing the indicated attributes, wherein objects in the fact repository are created by:
  extracting facts from web documents;
  determining entities with which the extracted facts are associated;
  storing the extracted facts in the fact repository; and
  associating the stored extracted facts with objects corresponding to the determined entities;
inserting the received cell value into the spreadsheet.

2. The method of claim 1, wherein the spreadsheet is a web spreadsheet page.

3. The method of claim 1, wherein the reference to the object and the attribute are each specified using one of a literal value and a spreadsheet cell reference.

4. The method of claim 1, wherein receiving the request to add the cell value comprises entering the request into a spreadsheet cell.

5. The method of claim 1, wherein receiving the request to add the cell value comprises applying a request corresponding to an existing spreadsheet cell to at least one other spreadsheet cell.

6. The method of claim 5, wherein applying the request to at least one other spreadsheet cell includes automatically adjusting cell references to correspond to the at least one other spreadsheet cell.

7. The method of claim 1, wherein receiving the request to add the cell value comprises specifying at least one of a data type and a data format for the received cell value, and wherein inserting the received cell value comprises displaying the received cell value according to the specified at least one of a data type and a data format.

8. The method of claim 1, wherein receiving the requested cell value further comprises receiving at least one of attribution data and confidence data associated with the requested cell value.

9. The method of claim 1, wherein inserting the received cell value comprises presenting a disambiguation interface to enable selection of a correct cell value from among a plurality of cell values.

10. A non-transitory computer readable storage medium storing one or more programs, the one or more programs comprising instructions, which when executed by a client system, cause the client system to perform a method comprising:
  displaying a spreadsheet;
  receiving a request to add a cell value to the spreadsheet, the request containing a reference to an object and an attribute;
  generating a query corresponding to the request;
  sending the query to a fact repository;
  receiving the requested cell value from the fact repository, wherein the cell value correspond to a value of a fact, the fact being associated with an object in the fact repository, wherein a respective fact includes an attribute field indicating an attribute and a value field describing the indicated attributes, wherein objects in the fact repository are created by:
    extracting facts from web documents;
    determining entities with which the extracted facts are associated;
    storing the extracted facts in the fact repository; and
    associating the stored extracted facts with objects corresponding to the determined entities;
  inserting the received cell value into the spreadsheet.

11. The non-transitory computer readable storage medium of claim 10, wherein the spreadsheet is a web spreadsheet page.

12. The non-transitory computer readable storage medium of claim 10, wherein the reference to the object and the attribute are each specified using one of a literal value and a spreadsheet cell reference.

13. The non-transitory computer readable storage medium of claim 10, wherein receiving the request to add the cell value comprises entering the request into a spreadsheet cell.

14. The non-transitory computer readable storage medium of claim 10, wherein receiving the request to add the cell value comprises applying a request corresponding to an existing spreadsheet cell to at least one other spreadsheet cell.

15. The non-transitory computer readable storage medium of claim 14, wherein applying the request to at least one other spreadsheet cell includes automatically adjusting cell references to correspond to the at least one other spreadsheet cell.

16. The non-transitory computer readable storage medium of claim 10, wherein receiving the request to add the cell value comprises specifying at least one of a data type and a data format for the received cell value, and wherein inserting the received cell value comprises displaying the received cell value according to the specified at least one of a data type and a data format.

17. The non-transitory computer readable storage medium of claim 10, wherein receiving the requested cell value further comprises receiving at least one of attribution data and confidence data associated with the requested cell value.

18. The non-transitory computer readable storage medium of claim 10, wherein inserting the received cell value comprises presenting a disambiguation interface to enable selection of a correct cell value from among a plurality of cell values.

19. A system for adding information to a spreadsheet, the system comprising:
  one or more processors and memory storing one or more programs, the one or more programs comprising instructions for:
  displaying a spreadsheet;
  receiving a request to add a cell value to the spreadsheet, wherein the cell value corresponds to a value of a fact with an associated attribute, the fact being associated with an object in a fact repository that includes a plurality of facts extracted from web documents, the request containing a reference to the object and the associated an attribute;
  generating a query corresponding to the request;
  sending the query to a fact repository;
  receiving the requested cell value from the fact repository, wherein the cell value corresponds to a value of a fact, the fact being associated with an object in the fact repository, wherein a respective fact includes an attribute field indicating an attribute and a value field describing the indicated attributes, wherein objects in the fact repository are created by:
    extracting facts from web documents;
    determining entities with which the extracted facts are associated;
    storing the extracted facts in the fact repository; and
    associating the stored extracted facts with objects corresponding to the determined entities;
  inserting the received cell value into the spreadsheet.

20. The system of claim 19, wherein the spreadsheet is a web spreadsheet page.

21. The system of claim 19, wherein the reference to the object and the attribute are each specified using one of a literal value and a spreadsheet cell reference.

22. The system of claim 19, wherein receiving the request to add the cell value comprises entering the request into a spreadsheet cell.

23. The system of claim 19, wherein receiving the request to add the cell value comprises applying a request corresponding to an existing spreadsheet cell to at least one other spreadsheet cell.

24. The system of claim 23, wherein applying the request to at least one other spreadsheet cell includes automatically adjusting cell references to correspond to the at least one other spreadsheet cell.

25. The system of claim 19, wherein receiving the request to add the cell value comprises specifying at least one of a data type and a data format for the received cell value, and wherein inserting the received fact comprises displaying the received cell value according to the specified at least one of a data type and a data format.

26. The system of claim 19, wherein receiving the requested cell value further comprises receiving at least one of attribution data and confidence data associated with the requested cell value.

27. The system of claim 19, wherein inserting the received cell value comprises presenting a disambiguation interface to enable selection of a correct cell value from among a plurality of cell values.

* * * * *

UNITED STATES PATENT AND TRADEMARK OFFICE
CERTIFICATE OF CORRECTION

PATENT NO. : 8,239,751 B1  
APPLICATION NO. : 11/749679  
DATED : August 7, 2012  
INVENTOR(S) : Rochelle et al.

Page 1 of 1

It is certified that error appears in the above-identified patent and that said Letters Patent is hereby corrected as shown below:

In Column 14, line 48, please delete "the associated".

Signed and Sealed this
Twenty-fifth Day of September, 2012

David J. Kappos
*Director of the United States Patent and Trademark Office*